US005656703A

United States Patent [19]
Costin et al.

[11] Patent Number: 5,656,703
[45] Date of Patent: Aug. 12, 1997

[54] COATING COMPOSITION OF EPOXY RESIN, METAL DI(METH)ACRYLATE AND POLY(METH)ACRYLATE

[75] Inventors: C. Richard Costin; Gary W. Ceska, both of West Chester; Michael A. Bailey, Aston, all of Pa.

[73] Assignee: Sartomer Company, Exton, Pa.

[21] Appl. No.: 488,511

[22] Filed: Jun. 9, 1995

[51] Int. Cl.$^6$ ..................................... C08L 63/02
[52] U.S. Cl. ..................... 525/531; 523/459; 525/532
[58] Field of Search ........................... 525/531, 532

[56] References Cited

U.S. PATENT DOCUMENTS

| | | | |
|---|---|---|---|
| 2,849,426 | 8/1958 | Miller | 260/79.5 |
| 2,910,445 | 10/1959 | Mock et al. | 260/2.1 |
| 2,981,722 | 4/1961 | Brown | 260/80.7 |
| 3,538,024 | 11/1970 | Dishburger et al. | 260/2 |
| 3,979,354 | 9/1976 | Dyckman et al. | 106/15 AF |
| 4,051,195 | 9/1977 | McWhorter | 525/532 |
| 4,302,561 | 11/1981 | Becher et al. | 525/327 |
| 4,303,563 | 12/1981 | Emmons et al. | 525/257 |
| 4,459,393 | 7/1984 | Barnhoorn et al. | 525/530 |
| 4,614,674 | 9/1986 | Lauterbach | 523/440 |
| 4,732,944 | 3/1988 | Smith, Jr. | 525/329.7 |
| 4,792,580 | 12/1988 | Doshi | 523/511 |
| 4,906,703 | 3/1990 | Bolton et al. | 525/329.9 |
| 5,229,467 | 7/1993 | Jung | 525/379 |

FOREIGN PATENT DOCUMENTS 63-137919  6/1988  Japan .

OTHER PUBLICATIONS

Derwent accession No. 75–51386W/31 for Japanese Patent No. 49–128940, Mitsubishi Rayon KK Dec. 1974.
Derwent accession No. 93–031733/04 for Japanese Patent No. 04–359070, Alpha Giken KK Dec. 1992.

*Primary Examiner*—Robert E. Sellers
*Attorney, Agent, or Firm*—Schnader Harrison Segal & Lewis

[57] ABSTRACT

A curable coating composition comprises a composition containing an epoxy resin and a poly(meth)arylate wherein an adhesive improving amount of a metal di(meth)acrylate such as zinc diacrylate and a polyamine curing agent is added.

20 Claims, No Drawings

COATING COMPOSITION OF EPOXY RESIN, METAL DI(METH)ACRYLATE AND POLY(METH)ACRYLATE

BACKGROUND OF THE INVENTION

1. Field of the Invention

The present invention relates to the use of metallic salts of acrylic and methacrylic acid as co-reactants in a Michael Addition coating composition.

2. Description of the Related Art

It is well known in the industry that acrylic esters can be used as reactive diluents to partially or completely replace solvents in amine cure epoxy coating systems to reduce viscosity and improve cure speed. However, the introduction of multifunctional acrylic esters into these systems can result in a decreased adhesion to certain substrates. Thus, a need exists for coating compositions with low viscosity, high cure speed, and improved adhesion to certain substrates.

It is accordingly an object of this invention to overcome the disadvantages and drawbacks of the known art and to provide coating compositions with low viscosity, high cure speed, and improved adhesion to a wide variety of substrates.

It is a further object of the present invention to provide coatings with low viscosity, high cure speed, and improved adhesion to a variety of substrates for use in two-component, ambient cure systems.

It is yet a further object of the present invention to provide coating compositions with low viscosity, high cure speed, and improved adhesion to a variety of substrates for use in one-component, high temperature bake systems.

Further objects and advantages of this invention will become apparent from the detailed description of a preferred embodiment which follows.

SUMMARY OF THE INVENTION

The present invention is directed to cured and curable compositions comprising (a) an acrylate modified epoxy coating composition, and (b) an adhesion improving effective amount of a metal salt of an $\alpha$, $\beta$-ethylenically unsaturated carboxylic acid. The present invention is also directed to a method for providing a curable composition, comprising the steps of (a) providing an acrylate modified epoxy coating composition, and (a) adding an adhesion improving effective amount of a metal salt of an $\alpha$, $\beta$-ethylenically unsaturated carboxylic acid to the acrylate modified coating composition.

Curable and cured compositions according to the present invention are useful as coatings and have the low viscosity and high cure speed of known high solids and solventless acrylate modified epoxy coatings. Moreover, curable and cured compositions according to the present invention have improved adhesion properties to certain substrates.

These and other features, aspects, and advantages of the present invention will be better understood with reference to the following description and dependent claims.

DESCRIPTION OF THE PREFERRED EMBODIMENT(S)

The term "substrate", as used herein, is intended to include metals, glass, rubbers or elastomers, plastics, polyesters, polyamides, polyacetals, and woven fabrics made of glass fibers or natural or synthetic organic fibers.

A curable composition according to the present invention comprises a metal salt, a high solids or solventless acrylate modified coating composition, and a polyamine. The term high solids means a composition having low solvent content in the range of approximately 0–25 percent by weight of the composition.

The metal component of the acrylic or methacrylic acid metal salt useful in the present invention may be aluminum, antimony, barium, cadmium, calcium, iron, lead, magnesium, mercury, molybdenum, nickel, potassium, silver, titanium, and zinc. A preferred metal is zinc. A preferred metal salt is zinc diacrylate.

Suitable acrylate modified epoxy coating compositions are disclosed in U.S. Pat. No. 4,051,195, which is incorporated herein by reference. Such acrylate modified epoxy coating compositions comprise an epoxide, a polyacrylate or polymethacrylate, and a polyamine. Suitable epoxides, polyacrylates, polymethacrylates, and polyamines are disclosed in U.S. Pat. No. 4,051,195. A preferred polyfunctional acrylate is 1,6 hexanedioldiacrylate. Trifunctional acrylates and higher are also preferred. Preferred epoxide resins are glycidyl polyethers of polyhydric phenols, particularly the glycidyl polyether of bisphenol A. A preferred polyamine is triethylenetetraamine.

The present invention is based on the discovery that a metal salt of an $\alpha$, $\beta$-ethylenically unsaturated carboxylic acid can be advantageously employed in acrylate modified epoxy coating compositions. Specifically, it has been discovered that the use of metal salts of acrylic and methacrylic acids in the compositions and methods of the present invention to promote crosslinking resulted in improved adhesion of the composition to substrates. Thus, the compositions and methods of the present invention are those in which organic solvents have been partially or completely replaced by acrylates, but which compositions exhibit improved adhesiveness to substrates compared to conventional acrylate modified epoxy coating compositions.

The amount of metal salt to be used in the compositions and methods of the present invention should be an amount effective to yield an improvement in adhesion of the composition to the substrate. Generally, the amount to be used should be an amount from about 0.5 parts to about 40 parts per 100 parts of the total compound. Preferably, amounts of from about 1 parts to about 10 parts are used.

The coating compositions of the present invention may be prepared for application in any conventional manner by the addition of pigments, antioxidants, dispersing aids, stabilizers and other additives that may be desirable depending on the end use of the coating. The coatings prepared from the compositions of the present invention may be applied to the substrate by any conventional means such as dipping, spraying, roller coating or the like. The coating compositions may be utilized in a variety of settings such as paints, protective coatings, and the like.

The invention will be clarified further by a consideration of the following examples, which are intended to be purely exemplary.

EXAMPLES.

In the following tables, all of the ingredients are expressed in parts by weight, unless otherwise noted, and each column corresponds to a numbered example.

Example 1

50 grams of a coating consisting of 5 parts of titanium dioxide dispersed into 95 parts of diglycidyl ether of bis A (available as EPON 828™ epoxy resin from Shell Oil Co.)

was prepared. This blend was then reacted with 15 parts triethylenetetraamine in a 100 ml disposable beaker. The coating was drawn down to a 15 mil dry film thickness using a wire wound rod and cured at 77° F. The time to gel was 50 minutes. The film exhibited a 100% loss of adhesion to cold-rolled steel using the cross-hatch adhesion method (ASTM D3359).

Example 2

50 grams of a coating consisting of 5 parts each of titanium dioxide and zinc diacrylate dispersed into 95 parts Epon 828 epoxy resin was prepared. This blend was also reacted with 15 parts triethylenetetraamine in a 100 ml disposable beaker. This coating was drawn down and cured as in Example 1. The time to gel was 49 minutes. The film exhibited only a 40% loss of adhesion to cold-rolled steel using the cross-hatch method as in Example 1.

Example 3

50 grams of a sealant formulation consisting of 40 parts of silicon dioxide dispersed into 44.2 parts diglycidyl ether of bis A (available as DER 331™ from Dow Chemical) epoxy resin, 11 parts 1,6 hexanediol diacrylate, 1.2 parts epoxy alamine adduct (available as ANCAMINE 2014AS™ from Air Products) and 3.6 parts of dicyanodiamide (available as AMICURE CG 1200™ from Air Products) was prepared. This formulation was then applied to a 1"×4" strip of aluminum at approximately ⅛" thickness. The specimens were baked at 325° for 20 minutes. Lap shear adhesion (1"×1" overlap) was tested following ASTM D1002. This formulation exhibited a Lap Shear Adhesion of 229 psi to aluminum and 400 psi to galvanized steel.

Example 4

50 grams of a sealant formulation consisting of 40 parts silicon dioxide dispersed into 44.2 parts DER 331 epoxy resin, 8.25 parts 1, 6 hexanediol diacrylate, 2.75 parts zinc diacrylate, 1.2 parts ANCAMINE 2014AS™ and 3.6 parts of AMICURE CG 1200™ was prepared. Lap Shear specimens were prepared and cured as in Example 3. This formulation exhibited a lap shear adhesion to aluminum of >550 psi and 716 psi to galvanized steel.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A curable composition comprising:
   (a) a composition comprising an epoxy resin and a poly(meth)acrylate
   (b) an adhesion improving effective amount of a metal di(meth)acrylate wherein said metal is selected from the group consisting of zinc and calcium;
   (c) a polyamine.
2. The composition of claim 1, wherein the composition (a) is a high solids composition (a).
3. The composition of claim 1, wherein the composition (a) is a solventless coating composition.
4. The composition of claim 1, wherein the metal salt is zinc diacrylate.
5. The composition of claim 1, wherein the metal di(meth) acrylate is zinc dimethacrylate.
6. The composition of claim 1, wherein the adhesion improving effective amount of the metal di(meth)acrylate is approximately 0.5 to 40 parts by weight per 100 parts of the composition.
7. The composition of claim 1, wherein the adhesion improving effective amount of the metal salt is approximately 1 to 10 parts by weight per 100 parts of the composition.
8. The composition of claim 1, wherein the epoxy resin is the diglycidyl ether of bisphenol A.
9. The composition of claim 2, wherein:
   the metal di(meth)acrylate is zinc diacrylate;
   the adhesion improving effective amount of the metal salt is approximately 1 to 10 parts by weight per 100 parts of the composition;
   composition (a) comprises:
     an epoxy resin;
     a poly(meth)acrylate; and
     a polyamine; and
   the epoxy resin is the diglycidyl ether of bisphenol A.
10. The composition of claim 9, wherein the composition (a) is solventless.
11. A cured composition provided by curing the composition of claim 1, 2, 3, 4, 5, 6, 7, 8, 9, or 10.
12. A method for providing a curable composition, comprising the steps of:
   (a) providing a composition comprising an epoxy resin and a poly(meth)acrylate; adding an adhesion improving effective amount of a metal diacrylate wherein said metal is selected from the group consisting of zinc and calcium to the composition (a); and
   (c) adding a polyamine.
13. The method of claim 12, wherein the composition (a) is a high solids composition (a).
14. The method of claim 12, wherein composition (a) is a solventless coating composition.
15. The method of claim 12, wherein the metal salt is zinc diacrylate.
16. The method of claim 12, wherein the amount of the metal di(meth)acrylate used is approximately 0.5 to 40 parts by weight per 100 parts of the composition.
17. The method of claim 12, wherein the amount of the metal di(meth)acrylate used is approximately 1 to 10 parts by weight per 100 parts of the composition.
18. The method of claim 12, wherein the epoxide is the diglycidyl ether of bis A.
19. The method of claim 13, wherein:
   the metal di(meth)acrylate is zinc diacrylate;
   the adhesion improving effective amount of the metal di(meth)acrylate is approximately 1 to 10 parts by weight per 100 parts of the composition;
   composition (a) comprises:
     an epoxy resin;
     a poly(meth)acrylate; and
     a polyamine;
   the epoxy resin is the diglycidyl ether of bisphenol A; and
   the poly(meth)acrylate is a trifunctional acrylic ester or higher.
20. The method of claim 19, wherein the composition (a) is solventless.

\* \* \* \* \*